(12) United States Patent
Klippert et al.

(10) Patent No.: US 10,075,228 B2
(45) Date of Patent: Sep. 11, 2018

(54) AIRCRAFT FLIGHT DATA MONITORING AND REPORTING SYSTEM AND USE THEREOF

(71) Applicant: LATITUDE TECHNOLOGIES CORPORATION, Victoria (CA)

(72) Inventors: Chad Klippert, Victoria (CA); Timothy Curtis, Brentwood Bay (CA); Mark Insley, Victoria (CA); Bradley Head, Victoria (CA); David Martin, Victoria (CA); Gerry Haustein, Victoria (CA); Andrew Nugent, Victoria (CA); Brad Zarikoff, Victoria (CA)

(73) Assignee: Latitude Technologies Corporation, Victoria, BC (CA)

( * ) Notice: Subject to any disclaimer, the term of this patent is extended or adjusted under 35 U.S.C. 154(b) by 0 days.

(21) Appl. No.: 14/761,923

(22) PCT Filed: Apr. 22, 2013

(86) PCT No.: PCT/IB2013/053176
§ 371 (c)(1),
(2) Date: Jul. 17, 2015

(87) PCT Pub. No.: WO2014/174340
PCT Pub. Date: Oct. 30, 2014

(65) Prior Publication Data
US 2016/0036513 A1 Feb. 4, 2016

(51) Int. Cl.
*H04Q 7/20* (2006.01)
*H04B 7/155* (2006.01)
(Continued)

(52) U.S. Cl.
CPC .............. *H04B 7/155* (2013.01); *B64D 45/00* (2013.01); *B64F 5/60* (2017.01); *H04L 41/5058* (2013.01);
(Continued)

(58) Field of Classification Search
CPC ............ B64D 2045/0085; B64D 45/00; B64F 5/0045; H04B 7/155; H04L 41/5058;
(Continued)

(56) References Cited

U.S. PATENT DOCUMENTS 3,778,007 A * 12/1973 Kearney, II ............... F41G 3/02
244/3.14
5,141,307 A * 8/1992 Bennett ................ G01C 15/004
356/141.1
(Continued)

FOREIGN PATENT DOCUMENTS

WO 2007078422 A2 7/2007
WO 2013045284 A2 4/2013

OTHER PUBLICATIONS

WIPO, Canadian International Searching Authority, International Search Report dated Jan. 7, 2014, International Patent Application No. PCT/IB2013/053176, 3 Pages.
(Continued)

*Primary Examiner* — Tan H Trinh
(74) *Attorney, Agent, or Firm* — Baumgartner Patent Law; Marc Baumgartner

(57) ABSTRACT

An aircraft flight data monitoring and reporting system is provided. The system comprises: an onboard flight data recording and reporting unit; a zero-configuration service discoverer; a remote base station; a remote flight data monitoring storage and analysis unit; a wireless communication link; and a network, the wireless communication link and network for communications between the aircraft flight
(Continued)

data monitoring and reporting system and each of the base station and the flight data monitoring storage and analysis unit, wherein the zero-configuration service discoverer facilitates auto-discovering between the flight data recording and reporting unit and the base station.

17 Claims, 8 Drawing Sheets

(51) Int. Cl.
| | |
|---|---|
| *H04W 4/50* | (2018.01) |
| *H04W 4/04* | (2009.01) |
| *B64D 45/00* | (2006.01) |
| *H04L 12/24* | (2006.01) |
| *H04W 48/16* | (2009.01) |
| *B64F 5/60* | (2017.01) |
| *H04L 29/08* | (2006.01) |
| *H04L 29/12* | (2006.01) |
| *H04W 88/08* | (2009.01) |

(52) U.S. Cl.
CPC ............. *H04L 67/10* (2013.01); *H04W 4/046* (2013.01); *H04W 4/50* (2018.02); *H04W 48/16* (2013.01); *B64D 2045/0085* (2013.01); *H04L 61/1511* (2013.01); *H04L 61/2007* (2013.01); *H04L 67/12* (2013.01); *H04L 67/16* (2013.01); *H04W 88/08* (2013.01)

(58) Field of Classification Search
CPC . H04L 61/1511; H04L 61/2007; H04L 67/10; H04L 67/12; H04L 67/16; H04W 48/16; H04W 4/001; H04W 4/046; H04W 88/08
USPC ..... 455/431, 422, 456, 427, 430, 9, 297, 66, 455/41.2, 41.1; 701/14, 35, 3, 24, 701/170.16, 70, 120, 9, 33, 29; 342/30, 342/385; 370/315, 310, 328, 945, 395; 709/206, 224, 219, 231; 29/592.1, 594; 340/945, 461, 452, 961, 978, 425.5, 5.83, 340/5.8, 974, 971; 73/29.01; 713/156; 345/619; 244/190, 189
See application file for complete search history.

(56) References Cited

U.S. PATENT DOCUMENTS

| | | | | | |
|---|---|---|---|---|---|
| 5,625,556 | A * | 4/1997 | Janky | ................... | G01S 19/235 342/357.68 |
| 5,890,079 | A * | 3/1999 | Levine | ...................... | B64F 5/00 340/961 |
| 6,092,008 | A * | 7/2000 | Bateman | ................ | G07C 5/008 244/1 R |
| 6,181,990 | B1 * | 1/2001 | Grabowsky | ............ | B64D 47/00 342/33 |
| 7,181,478 | B1 * | 2/2007 | Korson | ............. | G06F 17/30563 707/667 |
| 7,734,288 | B1 * | 6/2010 | Jensen | ............... | H04B 7/18506 455/41.2 |
| 7,848,698 | B2 * | 12/2010 | Batcheller | ................ | G09B 9/08 434/2 |
| 8,032,302 | B1 * | 10/2011 | Agronow | ................ | G01W 1/02 702/2 |
| 8,509,966 | B2 * | 8/2013 | Coulmeau | .............. | G01C 23/00 701/3 |
| 8,995,440 | B1 * | 3/2015 | LeBlanc | ............... | H04L 67/06 370/390 |
| 9,284,045 | B1 * | 3/2016 | Springer | ................ | G08G 5/003 |
| 9,346,557 | B2 * | 5/2016 | Jesse | ..................... | B64D 45/00 |
| 9,380,428 | B1 * | 6/2016 | Dame | ................... | H04W 4/023 |
| 2002/0004695 | A1 * | 1/2002 | Glenn | ................. | G07C 5/0891 701/32.2 |
| 2003/0003872 | A1 * | 1/2003 | Brinkley | ................... | G06F 8/61 455/66.1 |
| 2003/0065428 | A1 * | 4/2003 | Mendelson | .............. | G08G 5/00 701/9 |
| 2003/0067542 | A1 * | 4/2003 | Monroe | ................. | H04N 7/181 348/148 |
| 2003/0093187 | A1 * | 5/2003 | Walker | .................... | B64C 13/20 701/1 |
| 2004/0204801 | A1 * | 10/2004 | Steenberge | ........ | B64D 45/0015 701/3 |
| 2004/0229607 | A1 * | 11/2004 | La Chapelle | ......... | B64C 1/1492 455/431 |
| 2004/0260777 | A1 * | 12/2004 | Kolb | ...................... | G07C 5/008 709/206 |
| 2005/0065682 | A1 * | 3/2005 | Kapadia | ................. | G07C 5/008 701/36 |
| 2005/0215249 | A1 * | 9/2005 | Little | ...................... | H04W 4/18 455/431 |
| 2005/0228558 | A1 * | 10/2005 | Valette | ................... | G07C 5/008 701/33.4 |
| 2005/0228559 | A1 * | 10/2005 | Bloch | ................... | G07C 5/008 701/3 |
| 2006/0200570 | A1 * | 9/2006 | Stirbu | ............... | G06F 17/30067 709/230 |
| 2007/0027589 | A1 * | 2/2007 | Brinkley | ............ | H04B 7/18506 701/3 |
| 2007/0042772 | A1 * | 2/2007 | Salkini | ...................... | G01S 5/02 455/431 |
| 2007/0055416 | A1 * | 3/2007 | Allen | ................... | G08G 5/0013 701/3 |
| 2008/0039997 | A1 * | 2/2008 | Kolb | ...................... | G07C 5/085 701/33.4 |
| 2008/0086554 | A1 * | 4/2008 | Royalty | .............. | H04L 63/1408 709/224 |
| 2008/0178659 | A1 * | 7/2008 | Spinelli | .................. | G01N 25/58 73/29.01 |
| 2008/0186882 | A1 * | 8/2008 | Scherzer | .............. | H04W 88/02 370/310 |
| 2009/0031381 | A1 * | 1/2009 | Cohen | ............... | H04L 29/08846 725/115 |
| 2009/0051510 | A1 * | 2/2009 | Follmer | ................... | G07C 5/008 340/425.5 |
| 2009/0058635 | A1 * | 3/2009 | LaLonde | ............ | A61N 1/37282 340/539.11 |
| 2009/0298461 | A1 * | 12/2009 | O'Reilly | ........... | H04M 1/72572 455/404.2 |
| 2009/0305708 | A1 * | 12/2009 | Matsui | ................. | H04W 76/022 455/445 |
| 2009/0326792 | A1 * | 12/2009 | McGrath | ................. | G01W 1/08 701/120 |
| 2010/0063654 | A1 * | 3/2010 | Winterhalter | ........... | B64D 45/00 701/14 |
| 2010/0197282 | A1 * | 8/2010 | Uchida | ............... | G06F 21/6218 455/414.1 |
| 2010/0285825 | A1 * | 11/2010 | Doppler | ................. | H04W 28/22 455/509 |
| 2010/0304739 | A1 * | 12/2010 | Rooks | ................. | H04B 7/18506 455/431 |
| 2010/0312420 | A1 * | 12/2010 | Sham | ........................ | B64F 5/60 701/3 |
| 2011/0103293 | A1 * | 5/2011 | Gale | ...................... | H04W 4/046 370/315 |
| 2011/0125348 | A1 * | 5/2011 | Sandell | ................... | G07C 5/008 701/14 |
| 2011/0144875 | A1 * | 6/2011 | Rado | ..................... | B60T 8/1703 701/70 |
| 2011/0169684 | A1 * | 7/2011 | Margolin | .................. | G01S 5/12 342/30 |
| 2011/0194629 | A1 * | 8/2011 | Bekanich | .......... | H04M 3/42382 375/259 |
| 2011/0251781 | A1 * | 10/2011 | Brennan | ................. | G08G 5/003 701/120 |
| 2012/0001774 | A1 * | 1/2012 | Lyons | .................... | G01C 23/00 340/974 |

(56) References Cited

U.S. PATENT DOCUMENTS

| | | | |
|---|---|---|---|
| 2012/0147030 A1* | 6/2012 | Hankers | G01W 1/00 345/619 |
| 2012/0190386 A1* | 7/2012 | Anderson | G01C 15/04 455/456.3 |
| 2012/0191273 A1* | 7/2012 | Jacobs | H04B 7/18508 701/3 |
| 2012/0200460 A1* | 8/2012 | Weed | B64D 45/00 342/385 |
| 2012/0218127 A1* | 8/2012 | Kroen | G08G 5/0034 340/945 |
| 2012/0246457 A1* | 9/2012 | Sosnosky | H04L 12/00 713/2 |
| 2013/0032634 A1* | 2/2013 | McKirdy | G06Q 30/0271 235/375 |
| 2013/0126679 A1* | 5/2013 | Estkowski | G08G 5/0013 244/190 |
| 2013/0132522 A1* | 5/2013 | Ruppin | B64D 45/0015 709/219 |
| 2013/0145153 A1* | 6/2013 | Brown | H04L 63/0823 713/156 |
| 2013/0324034 A1* | 12/2013 | Klein | H04B 5/00 455/41.1 |
| 2014/0013002 A1* | 1/2014 | Holstein | H04B 7/18504 709/231 |
| 2014/0047107 A1* | 2/2014 | Maturana | H04L 43/04 709/224 |
| 2014/0071895 A1* | 3/2014 | Bane | H04L 69/321 370/328 |
| 2014/0075506 A1* | 3/2014 | Davis | H04L 67/12 726/3 |
| 2014/0304454 A1* | 10/2014 | Ellis | G06F 12/0802 711/103 |
| 2014/0306799 A1* | 10/2014 | Ricci | B60Q 1/00 340/5.83 |
| 2014/0324944 A1* | 10/2014 | Christopher | H04L 67/025 709/203 |
| 2015/0019049 A1* | 1/2015 | Kavounas | B64D 45/00 701/14 |
| 2015/0279218 A1* | 10/2015 | Irrgang | G08G 5/0039 701/3 |
| 2015/0339241 A1* | 11/2015 | Warner | G06F 13/10 710/74 |
| 2016/0133137 A1* | 5/2016 | Rencher | G08G 5/0091 701/537 |
| 2016/0176538 A1* | 6/2016 | Bekanich | B64D 45/00 701/14 |
| 2016/0196698 A1* | 7/2016 | O'Dell | G07C 5/085 701/33.4 |
| 2016/0242024 A1* | 8/2016 | Karren | G06F 21/6218 |
| 2017/0106997 A1* | 4/2017 | Bekanich | G08B 25/006 |
| 2017/0158346 A1* | 6/2017 | Lyons | B64D 43/00 |

OTHER PUBLICATIONS

WIPO, Canadian International Searching Authority, Written Opinion of the International Searching Authority dated Jan. 7, 2014, International Patent Application No. PCT/IB2012/053176, 6 Pages.
International Search Report issued in PCT/IB2013/053176 dated Jan. 7, 2014 by the ISA/CA (2 pages).

* cited by examiner

AIRCRAFT FLIGHT DATA MONITORING AND REPORTING SYSTEM AND USE THEREOF

CROSS REFERENCE TO RELATED APPLICATIONS

The present invention is filed under 35 U.S.C. § 371 as the U.S. national phase of International Application No. PCT/IB2013/053176, filed Apr. 22, 2013, which designated the U.S. and which is hereby incorporated in its entirety including all tables, figures, and claims.

FIELD

The present technology relates to systems and methods for collecting, analyzing and reporting flight data for both fixed wing and rotary wing aircraft. More specifically, the technology relates to wireless data transfer using zero configuration auto network discovery and heuristic triggers to analyze the data in real time. An integrated flight data recording and reporting unit is central to the system.

BACKGROUND

Tracking and reporting aircraft flights and anomalies therein is extremely important in the aircraft industry, whether for commercial airlines, or specialized applications such as helicopter logging and firefighting. In the earlier days, flight data recorders were used to determine what went wrong in a flight after the fact. Beacons were used to locate a downed aircraft.

There are a large number of functions that are desirable to have in an aircraft data recording and reporting system. These include capturing occurrences that take place during flight using Air Data and Attitude Heading and Reference Systems (ADHRS), Quick Access Recorder (QAR) and Flight Data Recorder (FDR) and FSM heuristics monitoring. Because of the large number of functions, there are a relatively large number of components in the system that must communicate effectively with one another. These require space, and must be coordinated with one another.

Accessing the data has also provided challenges. Generally, a maintenance person would manually download the FDR data from the aircraft using a QAR. Then manually transfer the memory media to an observation and analysis station.

Later, as it became apparent that more data could be available and would be of value, data were transmitted from the aircraft after it landed. For example, U.S. Pat. No. 6,181,990 discloses an aircraft data transmission system used with an aircraft having a data acquisition unit. The system includes a communications unit located in the aircraft and in communication with the data acquisition unit. The system also includes a cellular infrastructure in communication with the data communications unit after the aircraft has landed. The system further includes a data reception unit in communication with the cellular infrastructure.

More recently, aircraft tracking methods and systems have been developed. For example, US Patent Application 20040204801 discloses a safety and security system. The system includes an aircraft subsystem, a ground subsystem in communication with the aircraft subsystem via a wireless communication link, and an external system in communication with the ground subsystem via a second communication link. The aircraft subsystem includes a comparator module for comparing flight data with expected data, and a triggering module for triggering transmission of selected data when the flight data deviate from the expected data. The ground subsystem includes an analyzer module for analyzing the selected data transmitted from the aircraft. One of the ground subsystem and the external system includes a correlation module for correlating the selected data transmitted from the aircraft with information accessible by the external system. This approach is limited by the communication links that it uses.

In order to fully exploit the communication links that are currently available, the Internet Protocol (IP) address that will be assigned either needs to be known, or the requirement to know the IP address needs to be removed. Unfortunately, when mobile devices connect to or create a hotspot with an indeterminate IP address, addresses in the 192.168.0 class C subnet are usually used, but there is no documentation that confirms that is the only subnet it will use. Even if the subnet is known, the IP address dynamically assigned to the mobile device will not be known. Similarly, when a flight data recording and reporting unit connects, the IP address will not be known beforehand. Knowing what IP address will be assigned to the mobile base station ahead of time simply has not been feasible. Hence there is a need to be able to find a service on a network by service name without the client having to know the IP address or port number in advance.

A system for transferring data from flight data recording and reporting units is required that provides for auto-discovery and auto-connect between the flight data recording and reporting units and base stations, flight data monitoring storage and analysis units and the like. Preferably, the communications are bi-directional, allowing for reporting back to the aircraft or to remote locations. Autonomous reporting would reduce the reliance on human intervention.

SUMMARY

The present technology provides a system that increases the flexibility and capabilities of an aircraft flight data monitoring and reporting system. An integrated flight data recording and reporting unit is central to the system.

In one embodiment, an aircraft flight data monitoring and reporting system is provided. The system comprises: an onboard flight data recording and reporting unit; a zero-configuration service discoverer; a remote base station; a remote flight data monitoring storage and analysis unit; a wireless communication link; and a network, the wireless communication link and network for communications between the aircraft flight data monitoring and reporting system and each of the base station and the flight data monitoring storage and analysis unit, wherein the zero-configuration service discoverer facilitates auto-discovering between the flight data recording and reporting unit and the base station.

The flight data monitoring storage and analysis unit may be in a cloud.

The system may further comprise an observation station in communication with the base station and the flight data recording and reporting unit.

The base station may be a mobile base station and it may comprise a personal hot spot for communicating via the internet.

The system may further comprise a second mobile device comprising a zero-configuration service discoverer. The second mobile device may be configured to communicate with the flight data recording and reporting unit and the mobile base station via the internet.

The zero-configuration service discoverer may be a zero configuration multicast DNS standard (mDNS) with DNS-SD Service Discovery.

The system is preferably configured for bi-directional communication.

The flight data recording and reporting unit is defined as having a central processor and a communications module, and the central processor comprises a communication protocol and handling methods that operate between it and the communications module.

The system is configured to provide data collection, analysis, identification of abnormal events and triggering.

The system is also configured to provide post mission flight visualization via an observation station.

In another embodiment, an aircraft flight data monitoring and reporting system is provided. The system comprises: an onboard flight data recording and reporting unit; a remote base station; a remote flight data monitoring storage and analysis unit; a wireless communication link; and a network, the wireless communication link and network for communications between the aircraft flight data monitoring and reporting system and each of the base station and the flight data monitoring storage and analysis unit, wherein the system is configured for bi-directional communication.

The flight data recording and reporting unit has a central processor and a communications module, and the central processor comprises a communication protocol and handling methods that operate between it and the communications module.

The flight data monitoring storage and analysis unit is preferably in a cloud.

The system further comprises a zero-configuration service discoverer wherein the zero-configuration service discoverer facilitates auto-discovering between the flight data recording and reporting unit and the base station.

The system also further comprises an observation station in communication with the base station and the flight data recording and reporting unit.

The base station may be a mobile base station.

The mobile base station comprises a personal hot spot for communicating via the internet.

The system may further comprise a second mobile device comprising a zero-configuration service discoverer. The second mobile device is configured to communicate with the flight data recording and reporting unit and the mobile base station via the internet.

The system is configured to provide data collection, analysis, identification of abnormal events and triggering.

The system is also configured to provide post mission flight visualization via an observation station.

The system may further comprise a Flight Management System Computer (FMSC), an input device connected to the FMSC, and a display device.

In another embodiment, an onboard flight data recording and reporting unit for use in an aircraft flight data monitoring and reporting system is provided. The unit comprises a central processor comprising a communication protocol and handling methods that operate between it and a communications module to facilitate bi-directional communication between the flight data recording and reporting unit and the aircraft flight data monitoring and reporting system.

The central processor further comprises instructions for autonomous reporting.

The central processor further comprises instructions for pervasive networking.

The onboard flight data recording and reporting unit is configured to provide Flight Data Monitoring (FDM), including Air Data and Attitude Heading and Reference Systems (ADHRS), Quick Access Recorder (QAR), Wireless Data Link (WDL), Read Out Subscriber Equipment (ROSE), Flight Data Recorder (FDR) and engine data.

The onboard flight data recording and reporting unit comprises a battery backup, a 3-axis accelerometer, a 3-axis gyroscope, a solid-state compass, pitot pressure sensor, static pressure sensor, differential pressure sensor, a temperature sensor, an inertial measurement unit, a Global Positioning Satellite (GPS) feed or an internal GPS, and an internal real-time clock.

The onboard flight data recording and reporting unit further comprises Finite State Machine heuristics monitoring and a real time reporting system.

The communications module is configured to utilize auto discovery and zero configuration networking.

A method of recording and reporting flight data is also provided that utilizes the system of the present technology.

In another embodiment, a method of reporting flight data to a base station is provided. The method comprises the steps of: auto-discovering and zero-configuring between the flight data recording and reporting unit and the base station; networking; and reporting.

The networking is pervasive networking.

The reporting is autonomous, or polled reporting.

The method further comprises the step of the base station communicating back to the flight data recording and reporting unit.

In another embodiment, a method of communicating data in an aircraft flight data monitoring and reporting system is provided wherein the system comprises: an onboard flight data recording and reporting unit; a base station; a remote flight data monitoring storage and analysis unit; a wireless communication link; and a network, the method comprising auto-discovering and zero-configuring between the flight data recording and reporting unit and the base station, networking, and reporting.

The communicating preferably is bi-directional.

The method further comprises the onboard flight data recording and reporting unit communicating with an observation station.

The method further comprises the observation station providing post mission flight visualization.

The reporting is preferably in real-time and is autonomous.

The method of claim 40, wherein reporting is autonomous.

FIGURES

DESCRIPTION

Figure 1:
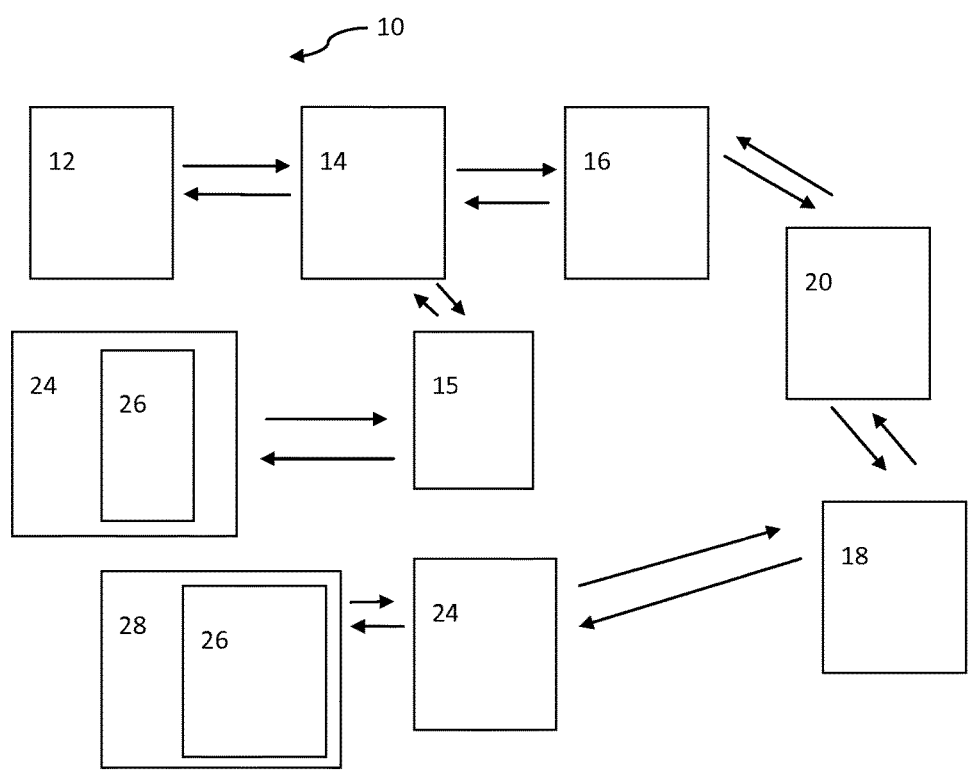
FIG. 1 is a block diagram of an embodiment of the present technology.

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

AP—Access Point; a Wi-Fi device that allows wireless access to a network. It has an SSID.
DNS—Domain Name Service. The network service and protocol to resolve IP addresses from hostnames.
FDM—Flight Data Monitoring
FSM—Finite State Machine
Hotspot—a commonly used term for a wireless access point that connects clients to the Internet. It can link or route using, for example, but not limited to, cellular or Wireless Fidelity (Wi-Fi).
IP—Internet Protocol
LAN—Local Area Network
MAN—Metropolitan Area Network
mDNS—Multicast Domain Name Service
Personal Hotspot—a term used to describe a hotspot that can be created by a user. It then functions as a wireless access point that connects a client to the Internet. It can link or route using, for example, but not limited to, cellular or Wi-Fi.
SD—Service Discovery
SSID—Service Set Identifier; a public name for a Wi-Fi network.
TCP—Transmission Control Protocol, a connection-oriented protocol over IP.
UDP—User-Datagram Protocol, a connectionless protocol over IP.
WAN—Wide Area Network.
WLAN—Wireless Local Area Network
WPA2—Wi-Fi Protected Access 2, a security method for Wi-Fi Access Points.
Zero-Configuration—when a service on a network can be found by service name without the client knowing in advance the IP address or port number. Also referred to as auto network discovery.
Cloud refers to cloud computing which is the use of computing resources (hardware and software) that are delivered as a service over a network (typically the Internet).

DETAILED DESCRIPTION

One embodiment of an aircraft flight data monitoring and reporting system, generally referred to as 10 is shown in FIG. 1. The system 10 includes a flight data recording and reporting unit 12 that communicates via a wireless communication link 14. The wireless communication link may be, for example, but not limited to, Wi-Fi, a VHF (Very High Frequency) communication link, an HF (High Frequency) communication link, or a Satcom (satellite communication) link. The wireless communication link 14 transmits to and from a network 16, for example, but not limited to a local area network, a metropolitan area network or a wide area network (LAN, MAN or WAN, respectively) which in turn transmits to and from a fixed base station 18 using a network and a zero-configuration service discoverer 20. The fixed base station 18 then communicates via the internet 24, with a flight data monitoring storage and analysis unit 26, which is preferably in a cloud 28. In the case where a Satcom 15 link is used, the flight data recording and reporting unit interacts directly, via Satcom 15, with a web-based (internet 24) flight data monitoring storage and analysis unit 26. Communication is bi-directional.

Figure 2:
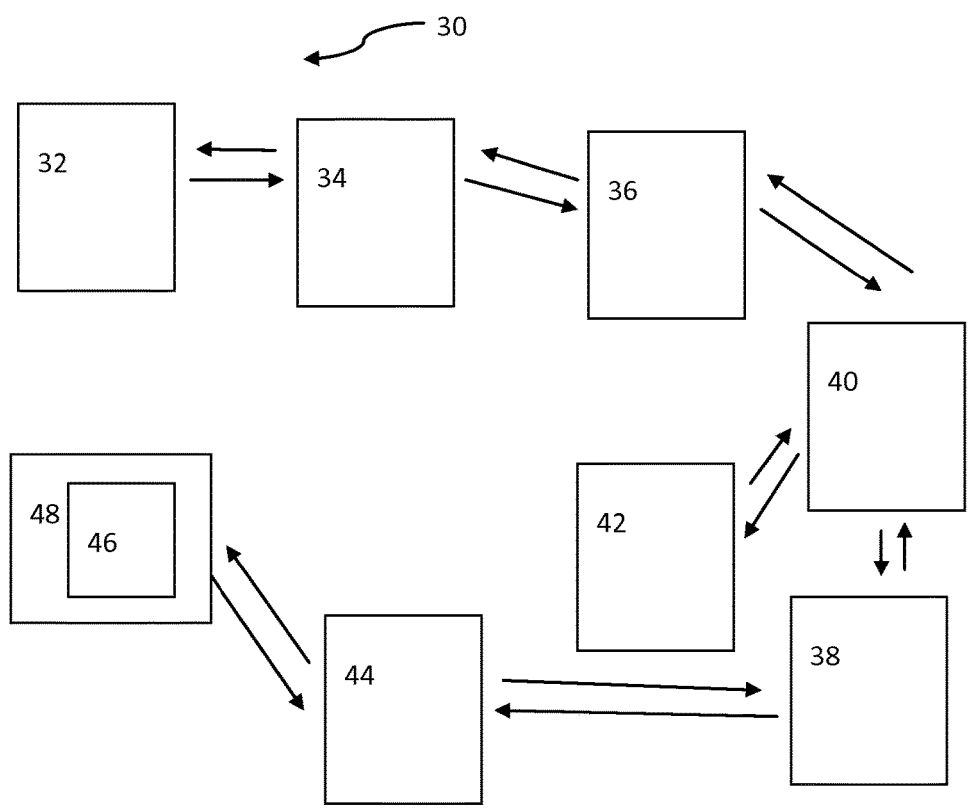
FIG. 2 is a block diagram of another embodiment of the present technology.

Another embodiment of an aircraft flight data monitoring and reporting system, generally referred to as 30, is shown in FIG. 2. The system 30 includes a flight data recording and reporting unit 32 that communicates with a wireless communication link 34. The wireless communication link 34 transmits to a network 36, for example, but not limited to a local area network, a metropolitan area network or a wide area network (LAN, MAN or WAN, respectively) which in turn transmits to a fixed base station 38 and to a mobile or fixed observation station 42 using a network and a zero-configuration service discoverer 40. The fixed base station 38 then communicates via the internet 44 to a flight data monitoring storage and analysis unit 46, which is preferably in a cloud 48. Communication is bi-directional.

Figure 3:
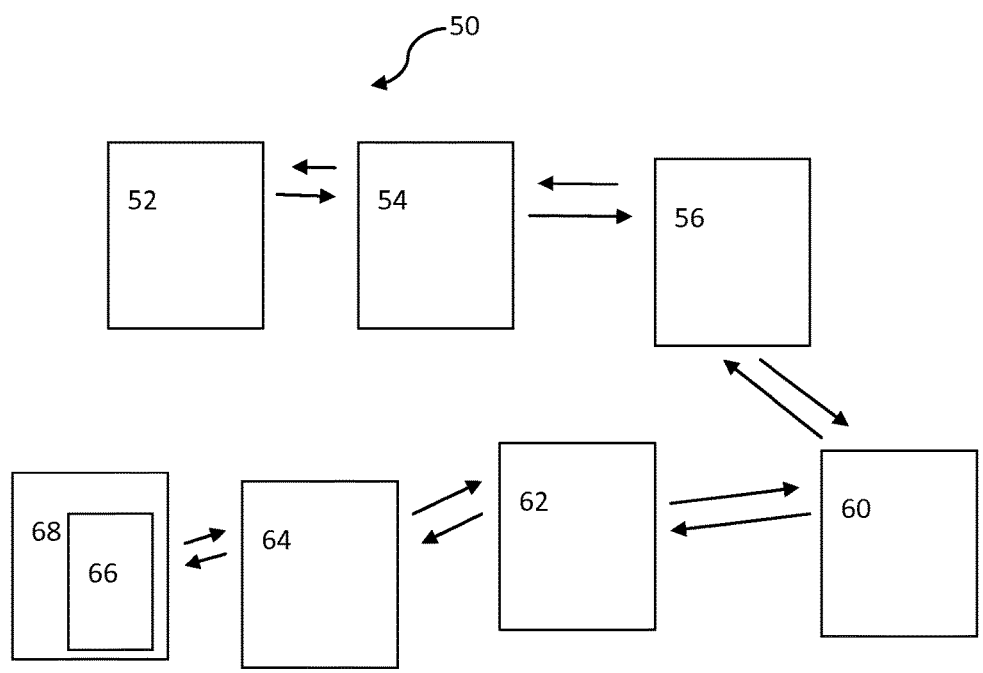
FIG. 3 is a block diagram of another embodiment of the present technology.

Another embodiment of an aircraft flight data monitoring and reporting system, generally referred to as 50, is shown in FIG. 3. The system 50 includes a flight data recording and reporting unit 52 that communicates with a wireless communication link 54. The wireless communication link 54 transmits to a network 56, for example, but not limited to a local area network, a metropolitan area network or a wide area network (LAN, MAN or WAN, respectively) which in turn transmits to a mobile base station 62 using a network via a zero-configuration service discoverer 60. The mobile base station 62 then communicates via the internet 64, to a flight data monitoring storage and analysis unit 66, which is preferably in a cloud 68. Communication is bi-directional.

Figure 4:
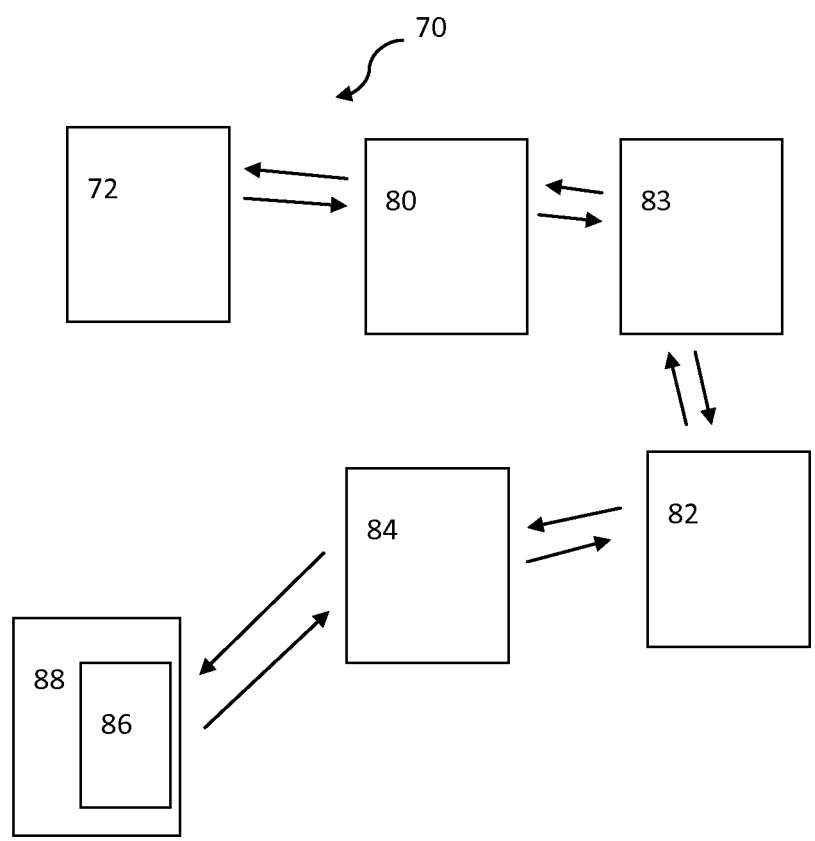
FIG. 4 is a block diagram of another embodiment of the present technology.

Another embodiment of an aircraft flight data monitoring and reporting system, generally referred to as 70, is shown in FIG. 4. The system 70 includes a flight data recording and reporting unit 72 that communicates with a mobile base station 82 with personal hotspot 83 using a zero-configuration service discoverer 80. The mobile base station 82 then communicates via the internet 84, to a flight data monitoring storage and analysis unit 86, which is preferably in a cloud 88. Communication is bi-directional.

Figure 5:
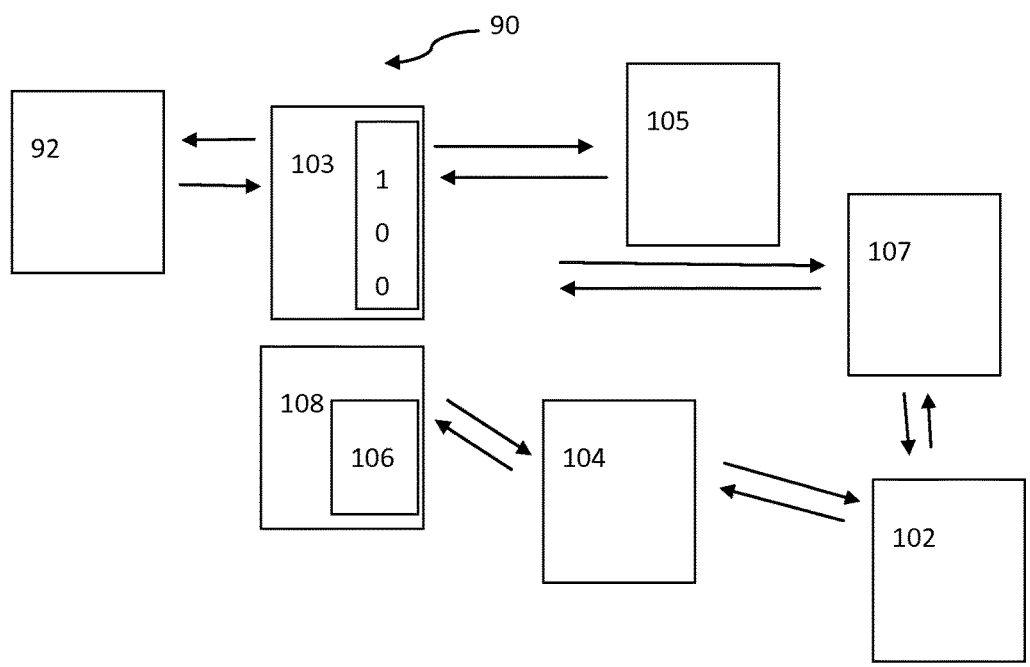
FIG. 5 is a block diagram of another embodiment of the present technology.

Another embodiment of an aircraft flight data monitoring and reporting system, generally referred to as 90, is shown in FIG. 5. The system 90 includes a flight data recording and reporting unit 92 that communicates with a mobile base station 102 via a second mobile device 103, which also provides internet access by one or more of a personal hotspot 105 and Wi-Fi access point 107 using a zero-configuration service discoverer 100. The mobile base station 102 then communicates via the internet 104, to a flight data monitoring storage and analysis unit 106, which is preferably in a cloud 108. Communication is bi-directional.

Figure 6:
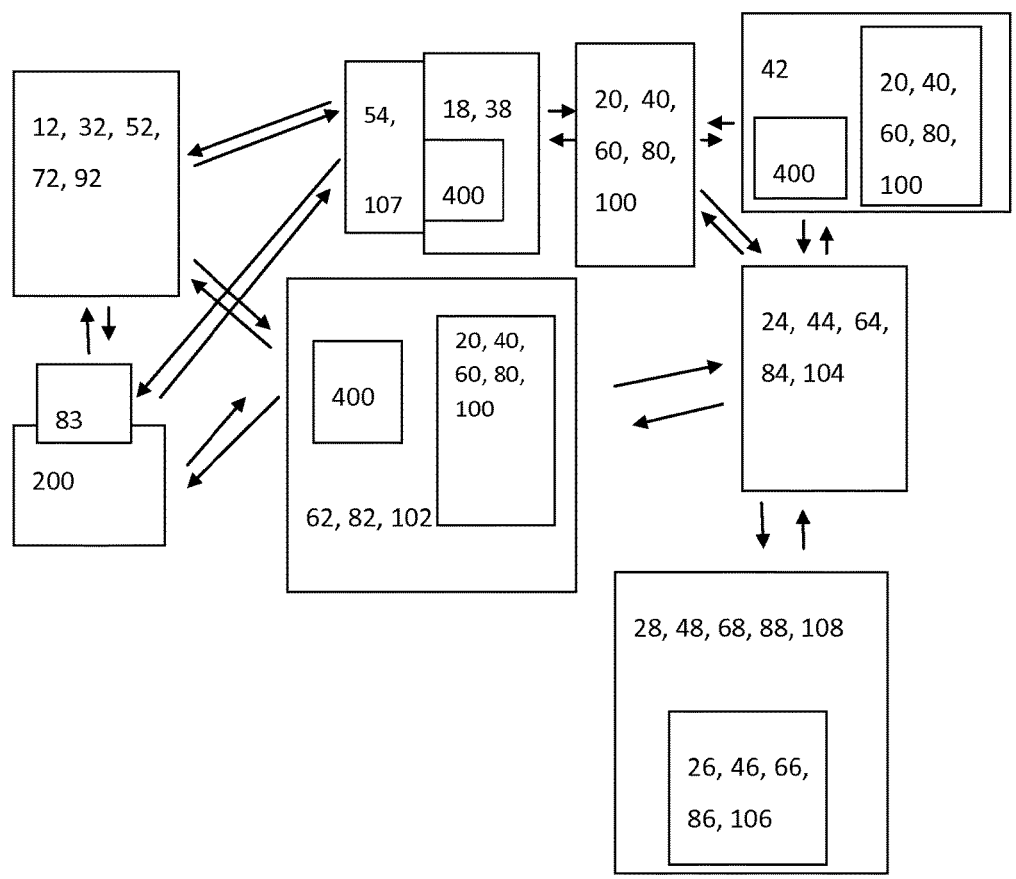
FIG. 6 is a block diagram showing data transfer.

As shown in FIG. 6, the fixed base stations 18, 38 and the mobile base stations 62, 82, 102 act as an intermediary cache, where some data processing occurs, however the main role is to safely and securely copy the flight data from the flight data recording and reporting unit 12, 32, 52, 72, 92 and send it, via the internet 24, 44, 64, 84, 104 to storage in the flight data monitoring storage and analysis unit 26, 46, 66, 86, 106, preferably in a cloud 28, 48, 68, 88, 108. In order to do this, the fixed base station 18, 38, the mobile base stations 62, 82, 102 and optionally, the observation station 42 locate the flight data recording and reporting unit 12, 32, 52, 72, 92, they report their condition, for example, available, or uploading to another base station 18, 38, 62, 82, 102, to a user 200, the user 200 decides which flight data recording and reporting unit 12, 32, 52, 72, 92 to connect to and manually initiates a download. Once the data reaches the flight data monitoring storage and analysis unit 26, 46, 66, 86, 106, the flight log records are processed into whole flights and prepared for analysis and playback. The observation station 42 communicates with the flight data monitoring storage and analysis unit 26, 46, 66, 86, 106. The fixed base station 18, 38, the mobile or fixed observation station 42 and the mobile base stations 62, 82, 102 may include a central processing unit 400, and the zero-configuration service discoverer 20, 40, 60, 80, 100. The user may use a personal hotspot 83 to assist in the data transfer.

The zero-configuration service discoverer 20 is a zero configuration multicast DNS standard (mDNS) with DNS-SD Service Discovery (Internet Engineering Task Force standard IETF RFC-6762 (mDNS). DNS-SD is IETF RFC-6763), and is collectively commonly known as Bonjour®. By adopting the zero-configuration service discoverer 20, the fixed base station 18, 38, the mobile or fixed observation station 42 and the mobile base station 62, 82, 102 auto-discover the presence of one or more flight data recording and reporting units 52, 72, 92 on the network 56 or personal hotspot 83 or second mobile device 103 that provides access with the personal hotspot 105 or Wi-Fi access point 107. This allows the base station 62, 82, 102 or mobile or fixed observation station 42 to discover the IP address that was assigned to the flight data recording and reporting unit 12, 32, 52, 72, 92. The flight data recording and reporting unit 12, 32, 52, 72, 92 does not need to know what IP address is assigned to the base station 18, 38, 62, 82, 102 or mobile or fixed observation station 42 ahead of time. This solves the problem of connecting to or creating a hotspot with an indeterminate IP address.

Note that Bonjour is only exemplary. Bonjour is Apple's implementation of Zero configuration networking (Zeroconf), a group of technologies that includes service discovery, address assignment, and hostname resolution. Bonjour locates devices such as printers, other computers, and the services that those devices offer on a local network using multicast Domain Name System (mDNS) service records. Zero configuration networking (zeroconf) is a set of techniques that automatically creates a usable Internet Protocol (IP) network without manual operator intervention or special configuration servers.

Zero configuration networking allows devices such as computers and printers to connect to a network automatically. Without zero configuration, a network administrator must set up services, such as Dynamic Host Configuration Protocol (DHCP) and Domain Name System (DNS), or configure each computer's network settings manually, which may be difficult and time-consuming. Thus, Bonjour is simply an example of a grouping of technologies to provide the foregoing technologies. The grouping may be provided as a single unit or a number of units, which together provide all the capabilities. To be clear, with these capabilities, the base station 62, 82, 102 requires no advanced knowledge of the flight data monitoring storage and analysis unit 26, 46, 66, 86, 106 address.

This then allows the base station 62, 82, 102 to communicate via the internet 24, 44, 64, 84, 104 to the flight data monitoring storage and analysis unit 26, 46, 66, 86, 106 providing real time FSM heuristics monitoring and real time reporting system. This also allows the base station 62, 82, 102 to act as proxy or 2-way relay unit for direct (proxy'd) communications between the flight data monitoring storage and analysis unit 26, 46, 66, 86, 106 unit if desired. The algorithms used provide identification of abnormal events and cause a trigger if a condition is exceeded. The system 10 is configured to provide data collection, analysis, identification of abnormal events and triggering if a condition is exceeded for both fixed wing aircraft and helicopters.

In all embodiments, the flight data recording and reporting unit 12, 32, 52, 72, 92 is configured to monitor flight crew compliance with a set of Standard Operating Procedures adaptable to different flight operation types. It captures occurrences that take place during flight, even those which the crews are unaware of, and it identifies issues irrespective of a company's reporting culture. It provides a flexible tool for building Flight Data Monitoring (FDM) into existing avionics systems both with and without existing data monitoring appliances and includes Air Data and Attitude Heading and Reference Systems (ADHRS), Quick Access Recorder (QAR), Wireless Data Link (WDL), Read Out Subscriber Equipment (ROSE), and Flight Data Recorder (FDR). It includes FSM heuristics monitoring and a real time reporting system so that data are transmitted automatically to a local satellite transceiver, the fixed base station 18, the fixed base station 38 and the mobile or fixed observation station 42 or the mobile base station 62, 82, 102.

The device provides multiple inputs (digital and analog and serial bus) for gathering data from sensory equipment installed in the aircraft. It is designed to perform data gathering and live event notification. Remotely configurable operating parameters allow for event message generation or control of the built in outputs when specific conditions are met based on the state of the sensory inputs. Conditions such as but not limited to, GPS position, altitude, groundspeed, accelerations (load factor), attitude (roll, pitch, yaw), heading and air data (air speed, pressure, and altitude) are monitored.

Figure 7:
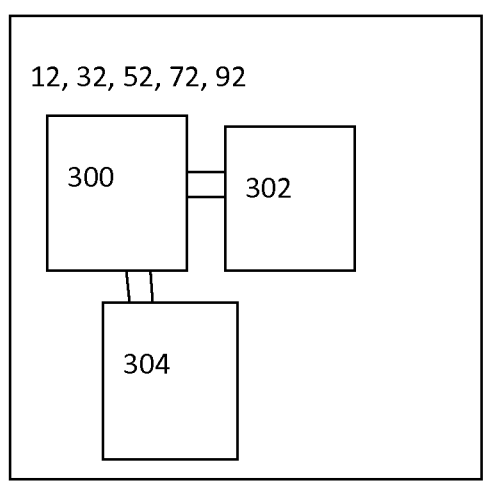
FIG. 7 is a block diagram showing the interaction between the flight data recording and reporting unit and Flight Management System Computer.

As shown in FIG. 7, in general terms, the flight data recording and reporting unit 12, 32, 52, 72, 92 may interface to a Flight Management System Computer (FMSC) 300, an input device 302 connected to the FMSC 300, and a display device 304 connected to the FMSC 300. The input device 302 may be used to load navigation information into the FMSC 300. Such information may include, for example, the latitude and longitude of various waypoints, airports, and navigational aids associated with the flight plan. The FMSC 300 may process the navigation information and forward the navigation information to the display device 304. The display device 304 may provide a visual indication of the various waypoints and airports, and the distances and headings between the waypoints, airports and navigational aids. During a flight, the FMSC 300 may receive flight data information from the flight data recording and reporting unit 12, 32, 52, 72, 92, process the flight data information, and forward the flight data information to the display device 304 for real-time display or to another display device that is positioned in the aircraft and is directly linked to the flight data recording and reporting unit 12, 32, 52, 72, 92.

Figure 8:
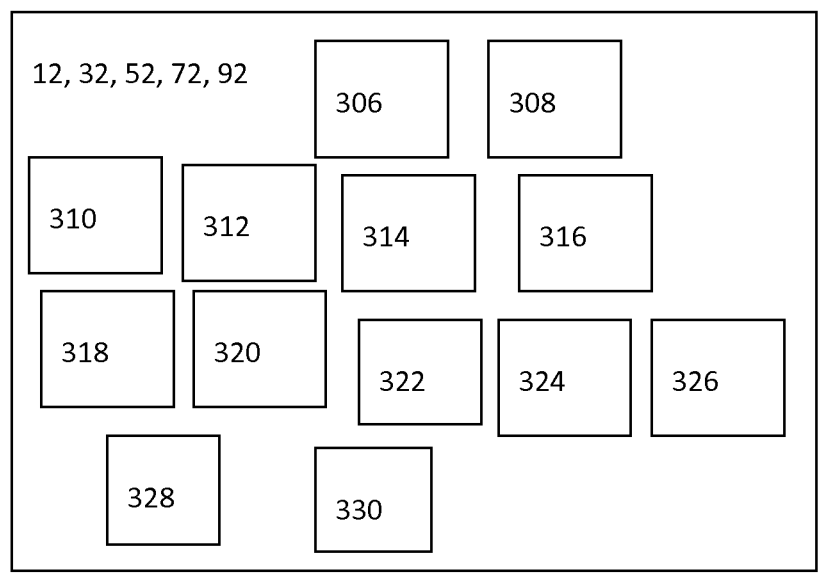
FIG. 8 is a block diagram showing the flight data recording and reporting unit of the present technology.

As shown in FIG. 8, in all embodiments, the flight data recording and reporting unit 12, 32, 52, 72, 92 more specifically includes a battery backup 306 and internal sensors to monitor the conditions including a 3-axis accelerometer 308, a 3-axis gyroscope 310, a solid-state compass 312, pitot pressure sensor 314, static pressure sensor 316, differential pressure sensor 318 and a temperature sensor 320. An inertial measurement unit (IMU) 322 capable of providing inertial loads including heading, yaw, pitch, and roll values is provided. A GPS feed 324 or an internal GPS is also provided. An internal real-time clock 326 with no main power connection is also provided. The value of the real time clock is used to timestamp all the logged data.

Internal trigger settings monitor and report internally triggered events. Thus, reports such as the following can be reported based on the data collected:

Engine cycles/engine hours;
Flight Cycles/flight hours;
Overspeed;
VSI (vertical speed indicator);
Bank angle;
Hard landing;
Height above ground (min/max);
Distance flown;
Scheduled tracking reports based on the primary reporting interval setting;
Position reports, including startup position; with a specific tag for startup as soon as it achieves a position fix after a power on condition; including Engine on/off cycles, engine hours, Flight cycles (# of take offs and landings), Flight hours, Distance flown.
Heuristic landing event report, based on the configured speed variables;
Heuristic take-off event report, based on the configured speed variables;
Elevation change report, including special reports for exceptions;
Geo fence exception report;
Stationary or lack of movement report;
Altitude report, including reporting at a Secondary Reporting Interval rate when below a specified altitude threshold. Above the altitude threshold the Primary Reporting Interval is in effect;
Data logging without transmission of position;
Emergency state reporting;
Ignition input controlled low power mode report; and
Heartbeat Mode reporting.

Other capabilities include providing Air Data and Attitude Heading and Reference Systems, Sensor telemetry and Quantitative Analysis Report generated and transmitted to remotely located stakeholders in the aircraft's operational aspects. Post mission flight visualization is also provided to remotely located stakeholders in the aircraft's operational aspects via the observation station 42, whether fixed or mobile.

Health and usage monitoring systems (HUMS) and/or Engine Trend Monitoring (ETM) is also supported. Each represent a basic data acquisition collection, analysis and sometimes onboard display system. Usually ETM and HUMS systems are very specialized to a particular aircraft and engine (powerplant) data collection for maintenance purposes, unlike FDR and FDAU equipment that are typically focused on flight safety operations. The flight data recording and reporting unit 12, 32, 52, 72, 92 bridges a gap in both aircraft maintenance and flight operations by providing a means of concentrating either or both of these specialized on-board data collection systems and facilitating the transfer of the data to the appropriate stakeholder in either real-time alerts or automated bulk data transfer. Engine data goes to an engine maintenance facility for Maintenance Operations Quality Assurance (MOQA) and flight operations data to a safety and logistics specialist department for Flight Operations Quality Assurance (FOQA).

As shown in FIG. 8, a central processor 328 of the flight data recording and reporting unit 12, 32, 52, 72, 92, has a communication protocol and handling methods that operate between it and a communications module 330 that provides the capability for bi-directional communication. The communications module can communicate to a Satcom, Wi-Fi, or USB. The architecture that controls both is internal, while the actual communication means may be internal or external. The central processor has instructions to pick the most appropriate communication medium, in other words, practices pervasive networking—it exploits multiple methods to ensure data is transferred to the appropriate stakeholder in a time appropriate manner.

Wi-Fi communications between the flight data recording and reporting unit 12, 32, 52, 72, 92 and the base station 18, 38, 62, 82, 102 is inherently 2-way via TCP/IP and common networking protocols.

The base station 18, 38, 62, 82, 102 as well as the observation station 42 and the flight data monitoring storage and analysis unit 46, 66, 86, 106 are all using common TCP—based networking protocols which are all inherently 2-way.

The base station 18, 38 62, 82, 102 is an installed software application that acts as a data relay point for log files being downloaded from a flight data recording and reporting unit 12, 32, 52, 72, 92. The base station 18, 38 62, 82, 102 can be a temporary station on tablets and mobile devices for ad hoc purposes and more immediate data transfer in a limitless number of locations.

The connection between the base station 18, 38 62, 82, 102 and the flight data recording and reporting unit 12, 32, 52, 72, 92 is established via the zero-configuration automated process. Once a connection has been established, the base station 18, 38 62, 82, 102 receives the data logs from the flight data recording and reporting unit 12, 32, 52, 72, 92 and uploads them to flight data monitoring storage and analysis unit 46, 66, 86, 106 via a secured link over the public internet 24, 44, 64, 84, 104. When those files have been acknowledged as received by the data centre, the download is confirmed back to the flight data recording and reporting unit 12, 32, 52, 72, 92 and the log files are erased on the flight data recording and reporting unit 12, 32, 52, 72, 92.

To be clear, there is a requester and a listener component in the zero-configuration service discoverer 60. There is no master-slave relationship between any of the base station 18, 38 62, 82, 102, the flight data recording and reporting unit 12, 32, 52, 72, 92 and the observation station 42—each of them can perform the requester function and each of them can perform the listener function. Once a request for an IP address has been sent, and the listener hears the request, IP addresses are shared. Once the IP addresses are shared, it is arbitrary which is considered the server and which is considered the client.

The base station 18, 38 62, 82, 102 has a secondary role as an installation, configuration and maintenance tool. While connected to the flight data recording and reporting unit 12, 32, 52, 72, 92, the base station 18, 38 62, 82, 102 can be used to upload new configurations, perform IMU calibrations and even retrieve the "last line read" (ROSE functionality) from the onboard bus and other systems that the flight data recording and reporting unit 12, 32, 52, 72, 92 is recording. This may be via Wi-Fi.

More specifically, ROSE functionality is combined in the base station 18, 38 62, 82, 102 with the ability to do other service routines to the flight data recording and reporting unit 12, 32, 52, 72, 92. This is done over a Wi-Fi connection. The flight data recording and reporting unit 12, 32, 52, 72, 92 and the base station 18, 38 62, 82, 102 automates this. There is no need for maintenance personnel to attend the base station 18, 38 62, 82, 102, unless they are performing service on the flight data recording and reporting unit 12, 32, 52, 72, 92 such as firmware or configuration settings updates, or using the Last Line Read (ROSE) function.

The observation station 42 is an application for the analysis, reporting and visualization of the flight data recording and reporting unit 12, 32, 52, 72, 92 log files. The observation station 42 is a server based application (with a browser based user interface) that translates raw flight data recording and reporting unit 12, 32, 52, 72, 92 log files based on pre-configured templates, identifies flights, events and exceedances based on rules defined by the user and displays summary reports of the data and allows for full data analysis including graphing and three dimensional (3D) flight playback. Any logged data can be displayed in the observation station 42 if it can be graphed against a time series.

While various exemplary embodiments are discussed and contemplated herein, the present disclosure provides many concepts that can be embodied in a wide variety of specific contexts. The specific embodiments discussed herein are, therefore, merely illustrative of specific ways to make and use the invention as ultimately claimed and are not meant to limit the invention in any way. Accordingly, for the ease of discussion, systems and methods for collecting, analyzing and reporting flight data embodiments are described below, as exemplary embodiments, and the description of specific exemplary embodiments is not intended to limit the exemplary embodiments disclosed herein.

Example 1

This scenario is the most common scenario for a routine flight, returning to a home base hangar. A regularly scheduled flight lands and the pilot 200 taxis to the maintenance hangar nearby. Because data transfer is automated, the shutdown procedure does not require special steps to accommodate the offloading of the flight data from the flight data recording and reporting unit 12, 32, 52, 72, 92 installed in the aircraft to monitor strain on its airframe as well as to analyze runway approaches at the airport. The system is setup to trigger the flight data recording and reporting unit 12, 32, 52, 72, 92 to commence uploading its data.

The aircraft is stopped at the hangar. The flight data recording and reporting unit 12, 32, 52, 72, 92 connects to the Wi-Fi network 56, with an SSID and a pass-phrase. The wireless communication link (Wi-Fi access point) 54 (see FIG. 6) is mounted near to the hangar and so the signal is strong. The flight data recording and reporting unit 12, 32, 52, 72, 92 connects and then attempts to open a connection to a base station 62, 82, 102. The base station 62, 82, 102 is online and the flight data recording and reporting unit 12, 32, 52, 72, 92 connects to it. The flight data recording and reporting unit 12, 32, 52, 72, 92 follows a protocol and begins uploading its flight log to the base station 62, 82, 102.

The pilot 200 is keen to examine his approach at the airport on the last leg. He wants to verify that the flight data recording and reporting unit 12, 32, 52, 72, 92 is uploading to the base station 62, 82, 102. The pilot 200 takes out his mobile device, which in this case is an iPhone®, checks that its Wi-Fi is connected to the appropriate network, which it is, and taps on the mobile base station application to open a mobile base station 62, 82, 102 or mobile or fixed observation station 42. Within a few seconds of the application launch, it lists two flight data recording and reporting unit 12, 32, 52, 72, 92 on the network. One is labeled as his aircraft. He sees that its status is 'Uploading'. He continues to monitor the application. In a moment, the status of the flight data recording and reporting unit 12, 32, 52, 72, 92 changes from 'Uploading' to 'Upload Complete'. The flight data recording and reporting unit 12, 32, 52, 72, 92 has finished uploading the data and it will soon be available on the flight data monitoring storage and analysis unit 26, 46, 66, 86, 106 web application for analysis and flight playback.

Example 2

The pilot 200 was asked to pilot a charter flight to a temporary airstrip. Staff are required to download the flight data monitoring records after each flight. After the flight, the pilot 200 lands the aircraft and taxis to a stop on the dirt runway. After the passengers exit the aircraft, the pilot 200 takes out his mobile device, which in this case is an iPad®, to use as the mobile base station 62, 82, 102 to retrieve the flight data from the onboard flight data recording and reporting unit 12, 32, 52, 72, 92.

There is no Wi-Fi network in the area, but there is a strong LTE cellular data network. The pilot 200 creates a personal hotspot 83 Wi-Fi access point using his iPad, by first setting his iPad name to the SSID needed for the onboard flight data recording and reporting unit 12, 32, 52, 72, 92 to communicate and sets the Wi-Fi hotspot pass-phrase to the appropriate pass-phrase.

He then taps on the mobile base station application to open a mobile base station 62, 82, 102. The pilot 200 can view the onboard flight data recording and reporting unit 12, 32, 52, 72, 92 information on the iPad. The onboard flight data recording and reporting unit 12, 32, 52, 72, 92 has a status of 'Ready'—meaning it can be connected to download flight logs. The pilot 200 taps on the mobile base station 62, 82, 102 and selects the command to download its flight data. The application runs the download. As it is downloading, it is also uploading to the Internet-based flight data monitoring storage and analysis unit, 66, 86, 106.

Thereafter, the transfer completes, the pilot 200 turns off the personal hotspot on his iPad and shuts down the iPad mobile base station application. He completes the aircraft shutdown procedure.

Later, the pilot uses a Wi-Fi Internet connection as his wireless communication link 54 to view the flight data log. He logs into the flight data monitoring storage and analysis unit 26, 46, 66, 86, 106 web application from his iPad's web browser and views the report of his last flight.

Example 3

The following are the steps taken in the most common scenario:

The aircraft lands, taxis to the hangar and stops. The aircraft door opens, or park brake is applied and this triggers the onboard flight data recording and reporting unit 12, 32, 52, 72, 92 to connect to a base station 62, 82, 102 and uploads its flight log (payload).

1. The onboard flight data recording and reporting unit 12, 32, 52, 72, 92 detects the Wi-Fi network 16, 36, 56, sees that it matches the SSID it wants and signs into the network using the WPA2 pass-phrase it has. An IP address is assigned to the onboard flight data recording and reporting unit 12, 32, 52, 72, 92.
2. The onboard flight data recording and reporting unit 12, 32, 52, 72, 92 follows mDNS protocol to establish a local link host name for it.
3. The onboard flight data recording and reporting unit 12, 32, 52, 72, 92 sends a Bonjour registration. Its UDP status service port is available to receive requests.
4. The onboard flight data recording and reporting unit 12, 32, 52, 72, 92 sends a multicast 'busy' status on the network using UDP port matching the service port, above.
5. It now attempts to connect to the preconfigured base station server (IP-address, port). It successfully connects then initiates upload of its flight records to the base station 62, 82, 102.
6. Meanwhile, it is servicing any UDP requests for its status, accepting UDP request on the service port it registered.
7. The upload completes, and so the onboard flight data recording and reporting unit 12, 32, 52, 72, 92 sends a multicast status update, closes the connection to the base station 62, 82, 102.
8. It then creates a mobile base station socket service, and registers this service with Bonjour.
9. The onboard flight data recording and reporting unit 12, 32, 52, 72, 92 sends a multicast of its status and then waits for a timeout period for new any new client connection. None are received, so the onboard flight data recording and reporting unit 12, 32, 52, 72, 92 shuts down.

Alternative Flows:
i) In Step 5, the onboard flight data recording and reporting unit 12, 32, 52, 72, 92 could not connect to the base station server. It then skips to step 8.

ii) In Step 5, the onboard flight data recording and reporting unit 12, 32, 52, 72, 92 didn't have an optionally set IP address and port number for a base station configured—it skips to step 8.

Example 4

In another scenario, the aircraft lands and a user 200 wishes to perform manual request to offload the onboard flight data recording and reporting unit 12, 32, 52, 72, 92 flight data logs. The user uses a mobile base station 62, 82, 102 connected to the local Wi-Fi access point 54, 107 (see FIG. 6). The aircraft may be at a remote airstrip and the operators wish to examine the flight logs, and don't have a regular base station nearby.

In this 'zero' configuration scenario, the user 200 starts up a mobile edition of the base station 62, 82, 102 on a mobile device, such as iPad, iPhone or Android® phone or tablet. To prevent unauthorized access, the mobile base station 62, 82, 102 requires that the user 200 had successfully authenticated through the service provider's Internet services 64, 84, 104, and will cache the credentials.

The steps are the same as previously described, except when it gets to Step 5, the onboard flight data recording and reporting unit 12, 32, 52, 72, 92 will fail to connect to the main base station 18 so the onboard flight data recording and reporting unit 12, 32, 52, 72, 92 skips down to step 8:

1. When the user 200 launches the mobile base station 62, 82, 102, it starts looking for a Bonjour service on the network 56. It sees that the onboard flight data recording and reporting unit 12, 32, 52, 72, 92 has registered itself with Bonjour. The application presents this onboard flight data recording and reporting unit 12, 32, 52, 72, 92 to the user in a list of possible onboard flight data recording and reporting units 52, 72, 92 present on the local area network 56.
2. The application, behind the scenes, has not only detected the presence of the onboard flight data recording and reporting unit 12, 32, 52, 72, 92, but using the now known UDP/IP address and Port number, the mobile base station application makes a user datagram request for the status of the onboard flight data recording and reporting unit 12, 32, 52, 72, 92.
3. The onboard flight data recording and reporting unit 12, 32, 52, 72, 92 receives the status request, and issues a UDP multicast of its status, as "ready".
4. The mobile base station 62, 82, 102 displays the updated status on the application, and then the user 200 initiates a request to download the onboard flight data recording and reporting unit 12, 32, 52, 72, 92 flight data. The mobile base station 62, 82, 102 had looked up the Bonjour service registration for this onboard flight data recording and reporting unit 12, 32, 52, 72, 92 to know how to connect to its TCP socket.
5. The onboard flight data recording and reporting unit 12, 32, 52, 72, 92 accepts the single TCP/IP socket connection. When the mobile base station 62, 82, 102 has completed the tasks, it closes the connection to the onboard flight data recording and reporting unit 12, 32, 52, 72, 92. It closes the connection to the cloud storage when it has completed pushing the flight log files up to the flight data monitoring storage and analysis unit 26, 46, 66, 86, 106 in the cloud storage service 68, 88, 108.

Alternative Flow:
I. In Step 4, the onboard flight data recording and reporting unit 12, 32, 52, 72, 92 times out waiting for a TCP/IP client to connect to it, having broadcasted via Bonjour its service availability. It times out and shuts down.

II. In Step 2, the mobile station 62, 82, 102 fails to find any available onboard flight data recording and reporting units 52, 72, 92 on the network 56. It doesn't display any to the user. The user quits the application.

Example 5

In this scenario, the user 200 will download the onboard flight data recording and reporting unit 12, 32, 52, 72, 92 flight data using a personal hotspot 83, 105, 107 Wi-Fi network. No Wi-Fi network with the organization's known Wi-Fi network SSID is available nearby, either because it's not physically there, or is shutdown. The user wants to send the onboard flight data recording and reporting unit 12, 32, 52, 72, 92 data and put it up into the flight data monitoring storage and analysis unit 26, 46, 66, 86, 106 in the cloud storage 68, 88, 108 for analytical processing.

6. The aircraft taxis in and terminates the flight. The onboard flight data recording and reporting unit 12, 32, 52, 72, 92 is triggered to attempt to offload its data collected.
7. The onboard flight data recording and reporting unit 12, 32, 52, 72, 92 first establishes connectivity to the Wi-Fi network 56 it is configured to connect to. In this case it does not yet see any Wi-Fi networks 56 available. It waits for a set period, scanning for Wi-Fi networks 56.
8. The user 200 of the mobile base station 62, 82, 102 configures a mobile device SSID to match the preconfigured SSID that the onboard flight data recording and reporting unit 12, 32, 52, 72, 92 is configured with. The user 200 then sets the password to match the preconfigured password for that network.
9. The user 200 turns on the personal hotspot 83, 105, 107 Wi-Fi network 56 on their mobile device.
10. The onboard flight data recording and reporting unit 12, 32, 52, 72, 92 now detects the Wi-Fi network 56, sees that it matches what it wants and logs into the network. An IP address is assigned to the onboard flight data recording and reporting unit 12, 32, 52, 72, 92.
11. At this point the flow follows the same as previous use-cases. Only this time, there will be no main base station 18 available, but the onboard flight data recording and reporting unit 12, 32, 52, 72, 92 does not know that and follows normal path.
12. Next, the onboard flight data recording and reporting unit 12, 32, 52, 72, 92 uses mDNS protocol to establish a local link host name for it.
13. The onboard flight data recording and reporting unit 12, 32, 52, 72, 92 sends a Bonjour registration for its UDP status service port.
14. The onboard flight data recording and reporting unit 12, 32, 52, 72, 92 multicasts a 'busy' status on the network using UDP port matching the service port, above.
15. The onboard flight data recording and reporting unit 12, 32, 52, 72, 92 attempts to connect to the main base station (fixed base station) 18, but attempts to connect fail.
16. The onboard flight data recording and reporting unit 12, 32, 52, 72, 92 creates a server socket to accept a single client, and then the onboard flight data recording and reporting unit 12, 32, 52, 72, 92 registers its service name with a service type base, setting up the port and hostname in the Bonjour registration.
17. Next, the user 200 runs the mobile base station 62, 82, 102 application.
18. The mobile base station 62, 82, 102 application interrogates the local network 56 looking for flightdmp service types.
19. It sees the onboard flight data recording and reporting unit 12, 32, 52, 72, 92. It sends a UDP status request to the onboard flight data recording and reporting unit 12, 32, 52, 72, 92, and displays the onboard flight data recording and reporting unit 12, 32, 52, 72, 92 and its status to the user 200.
20. The onboard flight data recording and reporting unit 12, 32, 52, 72, 92 responds that it is "ready", perhaps providing details of size of data stored not yet retrieved.
21. The user 200 selects to download the data from the onboard flight data recording and reporting unit 12, 32, 52, 72, 92. It connects to the TCP service port of the onboard flight data recording and reporting unit 12, 32, 52, 72, 92 and issues commands to commence download. The onboard flight data recording and reporting unit 12, 32, 52, 72, 92 multicasts a 'busy' status on its UDP service port.
22. The download completes and the mobile base station 62, 82, 102 closes the connection to the onboard flight data recording and reporting unit 12, 32, 52, 72, 92.
23. The onboard flight data recording and reporting unit 12, 32, 52, 72, 92 multicasts a 'ready' status. It then waits for a time period for any new service requests; otherwise shuts down.

Example 6

In this scenario, the onboard flight data recording and reporting unit 12, 32, 52, 72, 92 fails to reach any base station and shuts down after attempting connection after a period of time.

24. The onboard flight data recording and reporting unit 12, 32, 52, 72, 92 successfully connects to a Wi-Fi network with matching SSID, using the correct WPA2 pass phrase. It is dynamically assigned an IP address.
25. The onboard flight data recording and reporting unit 12, 32, 52, 72, 92 sets up its mDNS entries—first setting up its hostname local-link entry then registering its UDP Bonjour Service.
26. It then broadcasts itself on the network, its 'ready' status—announcing its presence (this is the requestor function). However, no mobile base station clients are attempting to connect to the onboard flight data recording and reporting unit 12, 32, 52, 72, 92 (there is no listener).
27. After a timeout period, the onboard flight data recording and reporting unit 12, 32, 52, 72, 92 shuts down having not had a client mobile base station connect to it.

Example 7

In this scenario the aircraft is in flight and an onboard sensor or signal triggers a threshold exceedance to or within the flight data recording and reporting unit 12, 32, 52, 72, 92. The flight data recording and reporting unit 12, 32, 52, 72, 92 then issues an alert or event message to the Satcom and/or satellite communications device (wireless communication link 14, 15) to relay this information to the flight data monitoring storage and analysis unit 26, 46, 66, 86, 106. The flight data monitoring storage and analysis unit 26, 46, 66, 86, 106 can in turn automatically notify all stakeholders in the aircrafts operation. Total latency for this process is measured in the seconds regardless of location of the aircraft and the stakeholder(s).

Example 8

Similar to example 7, however the remote stakeholder may be a maintenance person that requires further information about the exceedance event he/she just received. This person can issue a special request back through the flight data monitoring storage and analysis unit 26, 46, 66, 86, 106 via the satcom (wireless communication link 14, 15) (FIG. 1) and to the flight data recording and reporting unit 12, 32, 52, 72, 92. The flight data recording and reporting unit 12, 32, 52, 72, 92 then fulfils the remote (Mobile Terminated) request by creating a new message with the additional details and sends it back to the satcom (wireless communication link 14, 15) to relay back to the requesting person.

All methods described herein can be performed in any suitable order unless otherwise indicated herein or otherwise clearly contradicted by context. The use of any and all examples, or exemplary language (e.g., "such as") provided herein, is intended merely to better illuminate the example embodiments and does not pose a limitation on the scope of the claimed invention unless otherwise claimed. No language in the specification should be construed as indicating any non-claimed element as essential.

Advantages of the exemplary embodiments described herein may be realized and attained by means of the instrumentalities and combinations particularly pointed out in this written description. It is to be understood that the foregoing general description and the following detailed description are exemplary and explanatory only and are not restrictive of the claims below. While example embodiments have been described in detail, the foregoing description is in all aspects illustrative and not restrictive. It is understood that numerous other modifications and variations can be devised without departing from the scope of the example embodiment.

While example embodiments have been described in connection with what is presently considered to be an example of a possible, most practical and/or suitable embodiment, it is to be understood that the descriptions are not to be limited to the disclosed embodiments, but on the contrary, are intended to cover various modifications and equivalent arrangements included within the spirit and scope of the example embodiment. Those skilled in the art will recognize, or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. An aircraft flight data monitoring and reporting system, the system comprising: an onboard flight data recording and reporting unit; a remote flight data monitoring storage and analysis unit; a base station, which is a software application, the software application configured to copy and cache data from the onboard flight data recording and reporting unit and relay the cached data to the remote flight data monitoring, storage and analysis unit; a handheld device, the handheld device including the software application; a Satcom (satellite communication) link for transfer of data from the onboard flight data recording and reporting unit and the remote flight data monitoring, storage and analysis unit; and Wi-Fi, a network and an internet network, wherein the Wi-Fi and the network are for transfer of data to and from the onboard flight data recording and reporting unit and the base station; and the internet network is for transfer of data to and from the base station and the remote flight data monitoring, storage and analysis unit.

2. The system of claim 1, wherein the base station is configured to upload new configurations to the onboard flight data recording and reporting unit and perform inertial measurement unit calibrations.

3. The system of claim 2, wherein the base station is configured to retrieve "last line read" (ROSE functionality) from other systems that the flight data recording and reporting unit is recording.

4. The system of claim 3, wherein the base station is an onboard base station.

5. The system of claim 3, wherein the base station is a temporary base station.

6. The system of claim 5, wherein the temporary base station is configured to autonomously detect, connect with and transfer data to and from the flight data recording and reporting unit.

7. The system of claim 6, wherein the temporary base station is configured to autonomously instruct the flight data recording and reporting unit to delete data transferred to the remote flight data monitoring storage and analysis unit.

8. The system of claim 7, further comprising a Flight Management System Computer (FMSC), an input device connected to the FMSC, and a display device.

9. The system of claim 8, wherein the onboard flight data recording and reporting unit is configured to provide Flight Data Monitoring (FDM), including Air Data and Attitude Heading and Reference Systems (ADHRS), Quick Access Recorder (QAR), Wireless Data Link (WDL), Read Out Subscriber Equipment (ROSE), Flight Data Recorder (FDR) and engine data.

10. The system of claim 9, wherein the onboard flight data recording and reporting unit further comprises Finite State Machine heuristics monitoring and a real-time reporting system.

11. The system of claim 10, wherein the system is configured to provide post mission flight visualization.

12. The system of claim 11, further comprising a zero-configuration service discoverer, wherein the zero-configuration service discoverer is for auto-discovering and subsequent automated bidirectional communications between the onboard flight data recording and reporting unit and the temporary base station.

13. The system of claim 8, wherein the temporary base station is configured to copy and cache Flight Data Monitoring (FDM) data, including Air Data and Attitude Heading and Reference Systems (ADHRS), Quick Access Recorder (QAR), Wireless Data Link (WDL), Read Out Subscriber Equipment (ROSE), Flight Data Recorder (FDR) data and engine data from the onboard flight data recording and reporting unit and relay the cached data to the remote flight data monitoring, storage and analysis unit.

14. An aircraft flight data monitoring and reporting system, the system comprising: an onboard flight data recording and reporting unit; a remote flight data monitoring storage and analysis unit; a base station, which is a software application, the software application configured for conducting service routines on the onboard flight data recording and reporting unit, for copying and caching data from the onboard flight data recording and reporting unit and for relaying data between the onboard flight data recording and reporting unit and the remote flight data monitoring, storage and analysis unit; a mobile device, the mobile device selected from the group consisting of a cellular phone and a tablet, the mobile device including the software application;

a Satcom (satellite communication) link for transfer of data from the onboard flight data recording and reporting unit and the remote flight data monitoring, storage and analysis unit; and Wi-Fi, a network and an internet network, wherein the Wi-Fi and the network are for transfer of data to and from the onboard flight data recording and reporting unit and the base station; and the Internet network is for transfer of data to and from the base station and the remote flight data monitoring, storage and analysis unit.

15. The system of claim 14 wherein the cellular phone and the tablet are an Android® or an Apple®.

16. An aircraft flight data monitoring and reporting system, the system comprising: an onboard flight data recording and reporting unit; a remote flight data monitoring storage and analysis unit; a base station, which is a software application, the software application configured to upload new configurations to the onboard flight data recording and reporting unit, perform inertial measurement unit calibrations, and relay data between the onboard flight data recording and reporting unit and the remote flight data monitoring, storage and analysis unit; a handheld device, the handheld device including the software application; a Satcom (satellite communication) link for transfer of data from the onboard flight data recording and reporting unit and the remote flight data monitoring, storage and analysis unit; and Wi-Fi, a network and an Internet network, wherein the Wi-Fi and the network are for transfer of data to and from the onboard flight data recording and reporting unit and the base station; and the Internet network is for transfer of data to and from the base station and the remote flight data monitoring, storage and analysis unit.

17. The aircraft flight data monitoring and reporting system of claim 16, wherein the base station is configured to retrieve "last line read" (ROSE functionality) from other systems that the flight data recording and reporting unit is recording.

* * * * *